United States Patent
Ekbote et al.

(10) Patent No.: US 10,445,129 B2
(45) Date of Patent: Oct. 15, 2019

(54) VIRTUAL COMPUTING INSTANCE TRANSFER PATH SELECTION

(71) Applicant: VMware, Inc., Palo Alto, CA (US)

(72) Inventors: Siddharth Ekbote, San Jose, CA (US); Leon Cui, Beijing (CN)

(73) Assignee: VMware, Inc., Palo Alto, CA (US)

( * ) Notice: Subject to any disclaimer, the term of this patent is extended or adjusted under 35 U.S.C. 154(b) by 133 days.

(21) Appl. No.: 15/799,423

(22) Filed: Oct. 31, 2017

(65) Prior Publication Data
US 2019/0129738 A1 May 2, 2019

(51) Int. Cl.
*G06F 9/455* (2018.01)
*H04L 12/26* (2006.01)
*H04L 12/24* (2006.01)

(52) U.S. Cl.
CPC ........ *G06F 9/45558* (2013.01); *H04L 41/147* (2013.01); *H04L 43/045* (2013.01); *H04L 43/0888* (2013.01); *G06F 2009/4557* (2013.01); *G06F 2009/45583* (2013.01); *G06F 2009/45595* (2013.01)

(58) Field of Classification Search
CPC ....... G06F 9/45558; G06F 2009/45583; G06F 2009/4557; G06F 2009/45595; H04L 43/045; H04L 41/147; H04L 43/0888
See application file for complete search history.

(56) References Cited

U.S. PATENT DOCUMENTS

| | | | | |
|---|---|---|---|---|
| 10,187,257 B2 * | 1/2019 | Rahman | ............... | H04L 41/0816 |
| 2015/0331715 A1 * | 11/2015 | Sathyanarayana | ...... | H04L 67/10 709/226 |
| 2015/0370594 A1 * | 12/2015 | Ghosh | ................. | G06F 9/45533 718/1 |
| 2016/0041889 A1 * | 2/2016 | Banerjee | ............... | G06F 11/203 714/4.11 |
| 2018/0246751 A1 * | 8/2018 | Dong | ........................ | G06F 9/48 |

\* cited by examiner

*Primary Examiner* — Adam Lee
(74) *Attorney, Agent, or Firm* — Patterson + Sheridan, LLP

(57) ABSTRACT

The disclosure provides an approach for selecting a path to use in transferring a virtual computing instance such as a virtual machine (VM), across data centers. In one embodiment, throughput and throttling information are sampled (e.g., per second) when VMs are transferred from a source data center to a destination data center, and the sampled information is used to construct histograms that provide performance profiles of the VM transfers. Such histogram information across a number of VM transfers can then be mined to determine trends. In turn, trends determined from historical histogram information may be extrapolated into the future to predict performance of a subsequent VM transfer operation and to select a path and/or destination storage and host pair to use for the VM transfer operation.

20 Claims, 9 Drawing Sheets

VIRTUAL COMPUTING INSTANCE TRANSFER PATH SELECTION

BACKGROUND

Computer virtualization is a technique that involves encapsulating a computing machine platform into a virtual machine (VM) that is executed under the control of virtualization software running on a hardware computing platform (also referred to herein as "host computer" or "host"). A group of hardware computing platforms may be organized as a cluster to provide resources for VMs. In a data center, it is common to see hundreds, even thousands, of VMs running on multiple clusters of hosts.

VMs running in hosts are often actively managed to improve their overall performance. One example is transfer of VMs from one host to another host. As used herein, "transfer" of a VM may include copying the VM to a new location and deleting the original VM, or replicating a VM to a new location, resulting in an additional copy of the VM. The transfer of a VM may be "live," meaning a running VM is moved, or not. VMs may undergo transfer from busy host computers to underutilized host computers to achieve load balancing across host computers. Transfer of VMs also may be carried out to enable host computer maintenance. Examples of tools that may be used to perform a VM transfer include vMotion® and vSphere® Replication™, which are commercially available from VMware, Inc. of Palo Alto, Calif.

Transfers of VMs across data centers in particular may need to be carried out across various components of the system, such as (physical and/or virtual) storage devices, network devices, network boosters (e.g., wide area network (WAN) optimizers), etc. Some components on a transfer path may be underperforming components, historically and/or currently, and may undermine a VM transfer. Additionally, network connections between components on a transfer path may be underperforming, historically and/or currently. Transfer operations for large VMs that utilize suboptimal paths may run for days before ultimately failing, which can cause significant waste of resources and user frustration.

SUMMARY

One or more embodiments provide a method for transferring a virtual computing instance from a first data center to a second data center. The method generally includes determining at least one of throughput and throttling information associated with transfers of one or more virtual computing instances over a plurality of paths from a host and a storage unit in the first data center to one or more hosts and one or more storage units in the second data center. The method further includes generating, for each of the transfers of the one or more virtual computing instances, one or more histograms using the at least one of throughput and throttling information that is determined for the transfer. The method also includes predicting, for each of the plurality of paths, a corresponding likelihood of success if the virtual computing instance were transferred over the path based, at least in part, on one or more distributions of samples in the histograms generated for transfers of virtual computing instances over the path. In addition, the method includes transferring the virtual computing instance over one of the plurality of paths based, at least in part, on the predicted likelihood of success corresponding to the one of the plurality of paths.

Further embodiments include a non-transitory computer-readable storage medium storing instructions that, when executed by a computing system cause the computer system to perform the method set forth above, and a computing system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments presented herein provide techniques for selecting a path to use in transferring a virtual computing instance across data centers. Although virtual machines (VMs) are used herein as a reference example of virtual computing instances, it should be understood that techniques disclosed herein are also applicable to other types of virtual computing instances, such as containers. In one embodiment, throughput and throttling information are sampled (e.g., per second) when VMs are transferred from a source data center to a destination data center, and such information is used to construct histograms that provide performance profiles of the VM transfers in terms of throughput and throttling events, respectively. Such histogram information is stored (e.g., in a database), and information across a number of VM transfer operations can then be mined to determine trends. For example, in throughput histograms it is generally desirable to observe throughput samples being clustered towards the high throughput end of the histogram, and in throttle histograms it is generally desirable to observe clustering of samples at the end indicating fewer or no throttle events. Trends determined from historical histogram information may be extrapolated into the future to predict performance of a subsequent VM transfer operation and to select a path and/or destination storage and host pair to use for the VM transfer operation.

Figure 1A:
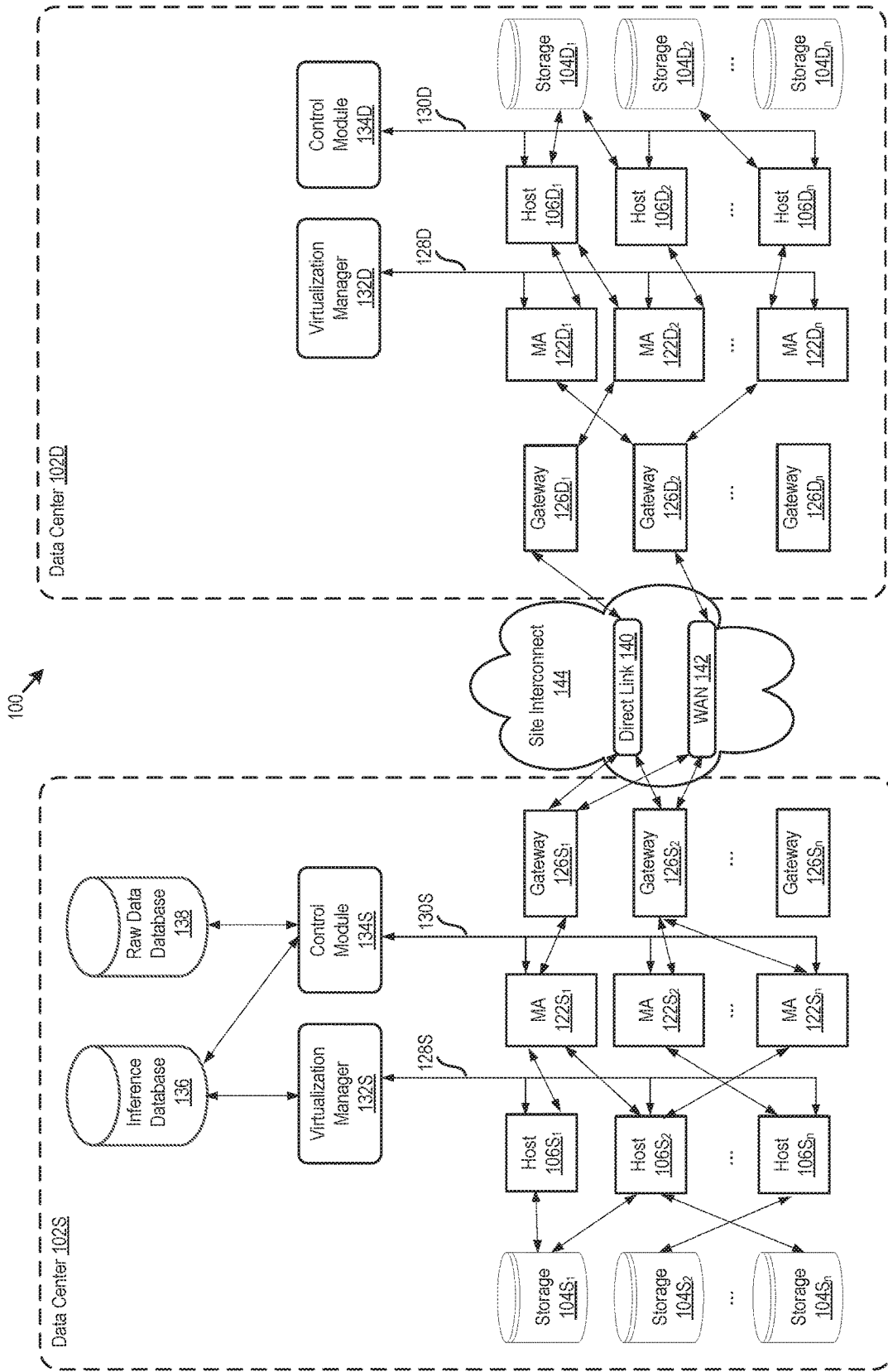
FIG. 1A depicts a block diagram of a cross-site computing system in which one or more embodiments of the present disclosure may be utilized.

FIG. 1A is a block diagram of a cross-site computing system 100 in which one or more embodiments of the present disclosure may be utilized. Cross-site computing system 100 is configured to provide a common platform for managing and executing workloads seamlessly between source and destination data centers 102S, 102D. As shown, cross-site computing system 100 includes a source data center 102S and a destination computing system 102D. In one embodiment, source and destination computing systems 102S and 102D may be virtualized computing systems. Each of source and destination data centers 102S and 102D may be an "on-premise" data center or a cloud-based data center. An on-premise data center is typically controlled and administrated by a particular enterprise or business organization, while a cloud data center is typically operated by a cloud computing service provider and exposed over a wide area network (WAN) as a service available to account holders, such as a particular enterprise in addition to other enterprises. In FIG. 1A, the "S" in numbers stands for "source," and the "D" in the numbers stands for "destination." "Source" is used herein to refer to the source of a virtual machine in a virtual machine transfer operation, and "destination" is used to refer to the destination of a virtual machine in a virtual machine transfer operation. Although discussed herein primarily with respect to a VM transfer from data center 102S to data center 102D, it should be understood that data center 102D may also be the source of VM transfers and data center 102S the destination of such transfers.

Illustratively, source data center 102S includes host computer systems $106S_1$ to $106S_n$ (collectively referred to as hosts 106S and individually referred to as host 106S). One of the computer systems 106S is depicted in greater detail in FIG. 1B. It should be understood that the other source and destination host computers 106S and 106D may include similar components. Host computer system 106S may be constructed on a server grade hardware platform 118, such as an x86 architecture platform. As shown in FIG. 1B, hardware platform 118 of host computer 106S includes one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and may be stored in memory 110 and in local storage 114. Memory 110 is a device allowing information, such as executable instructions, cryptographic keys, virtual disks, configurations, and other data, to be stored and retrieved. Memory 110 is where programs and data are kept when the processor is actively using them. Memory 110 may be a byte-addressable, random access memory, and memory 110 may include, for example, one or more random access memory (RAM) modules. Network interface 112 enables host 106 to communicate with another device via a communication medium, such as a network 128S within data center 102S. Network interface 112 may be one or more network adapters, also sometimes referred to as Network Interface Cards (NICs). Storage system 114 represents persistent one or more storage devices (e.g., one or more hard disks, flash memory modules, solid state disks, and optical disks) in host computer system 106S.

Host 106S may communicate with one or more external source storage units $104S_1$ to $104S_n$ (collectively referred to as storage units 104S and individually referred to as storage unit 104S) via HBA 115 and/or NIC 112. Source storage units 104S (and destination storage units 104D) may include any physical or logical data stores, such as one or more logical unit numbers (LUNs) or other logical data stores exported from physical storage systems, storage area networks (SANs), network-attached storage (NASs), disk arrays, other network data storage systems, or some combination of these. Exemplary host-storage connections between source hosts $106S_1$ to $106S_n$ and storage units $104S_1$ to $104S_n$ are depicted by arrows. That is, for example, although source host $106S_2$ is depicted as being able to access source storage unit $104S_1$ and source storage unit $104S_n$, but not source storage unit $104S_2$, source data center 102S may alternatively be to be able to access all, none, or a different subset of source storage units 104S.

As shown, host 106S is configured to provide a virtualization layer that abstracts processor, memory, storage, and networking resources of hardware platform 118 into multiple virtual machines $120_1$ to $120_n$ (collectively referred to as VMs 120) that run concurrently on the same hosts. VMs 120 run on top of a software interface layer, referred to herein as a hypervisor 116, that enables sharing of the hardware resources of source host 106S by VMs 120. One example of a hypervisor 116 that may be used is a VMware ESXi™ hypervisor provided as part of the VMware vSphere® solution made commercially available from VMware, Inc. of Palo Alto, Calif. Hypervisor 116 may run on top of the operating system of source host 106S or directly on hardware components of source host 106S.

Source data center 102S includes a management component, depicted in FIG. 1A as a source virtualization manager 132S, that may communicate to the one or more hosts 106S via a network 128S. In one embodiment, source virtualization manager 132S is a computer program that executes in a central server in source data center 102S, or alternatively, source virtualization manager 132S may run in a VM, e.g. in one of hosts 106S. One example of a virtualization manager is the vCenter Server™ product available from VMware, Inc. Source virtualization manager 132S is configured to carry out administrative tasks for source data center 102S, including managing source hosts 106S, managing VMs 120 running within each source host 106S, provisioning VMs, transferring VMs from one host to another host, transferring VMs from source data center 102S to destination data center 102D, and load balancing between hosts 106S and between source data center 102S and destination data center 102D.

In one embodiment, source virtualization manager 132S is configured to manage and integrate virtualized computing resources provided by destination data center 102D with virtualized computing resources of source data center 102S to form a unified computing platform. In such a case, source virtualization manager 132S may be configured to transfer VMs from source data center 102S to destination data center 102D, deploy VMs in destination data center 102D, and/or perform other "cross-site" administrative tasks. One example of a virtualization manager that can perform "cross-site" administrative tasks is the VMware vCloud Connector® product made available from VMware, Inc. Although discussed herein primarily with respect to such virtualization managers 132S and 132D that integrate source and destination data center resources, it should be understood that the functionalities of the virtualization managers, e.g., selecting a path for cross data center VM transfer, described herein may also be performed by other types of software or even hardware.

Source gateway 126S (e.g., executing as a virtual appliance) is configured to provide source data center 102S with connectivity to the outside world, and in particular to an external data center, such as destination data center 102D. Source gateway 126S connects to destination data center 102D through a site interconnect 144. Site interconnect 144 may comprise a variety of connections, including WAN 142 (e.g., Internet), a dedicated direct link 140, and/or other connection types not shown in FIG. 1A, such as a local area network (LAN), Multiprotocol Label Switching (MPLS), or a "stretched" layer-2 (L2) network.

Source gateway 126S may manage external public IP addresses for VMs 120 on source hosts 106S and may route traffic incoming to and outgoing from source data center 102S. Source gateway 126S may provide networking services, such as firewalls, network address translation (NAT), dynamic host configuration protocol (DHCP), and load balancing. Source gateway 126S may also provide virtual private network (VPN) connectivity with other VPN endpoints, such as a destination gateway 126D within destination data center 102D. In an embodiment, one or more source mobility agents 122S may run in the same virtual or physical machine as source gateways 126S. In an alternatively embodiment, mobility agents 122S and source gateways 126S may run in separate virtual or physical machines.

To facilitate cross-site VM transfer, source data center 102S includes one or more source mobility agents, shown as mobility agents $122S_1$ to $122S_n$ (collectively referred to as source mobility agents 122S and individually referred to as source mobility agent 122S). Destination data center 102D also includes one or more destination mobility agents, shown as mobility agents $122D_1$ to $122D_n$ (collectively referred to as destination mobility agents 122D and individually referred to as destination mobility agent 122D). Mobility agents 122S, 122D may run inside VMs in each respective data center 102S, 102D or directly on hardware computer systems.

Figure 1C:
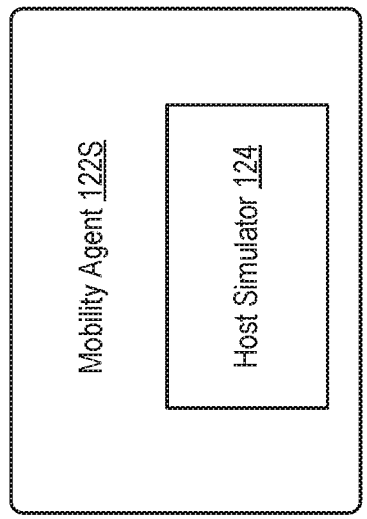
FIG. 1C depicts a block diagram of a mobility agent, according to an embodiment.
Figure 1B:
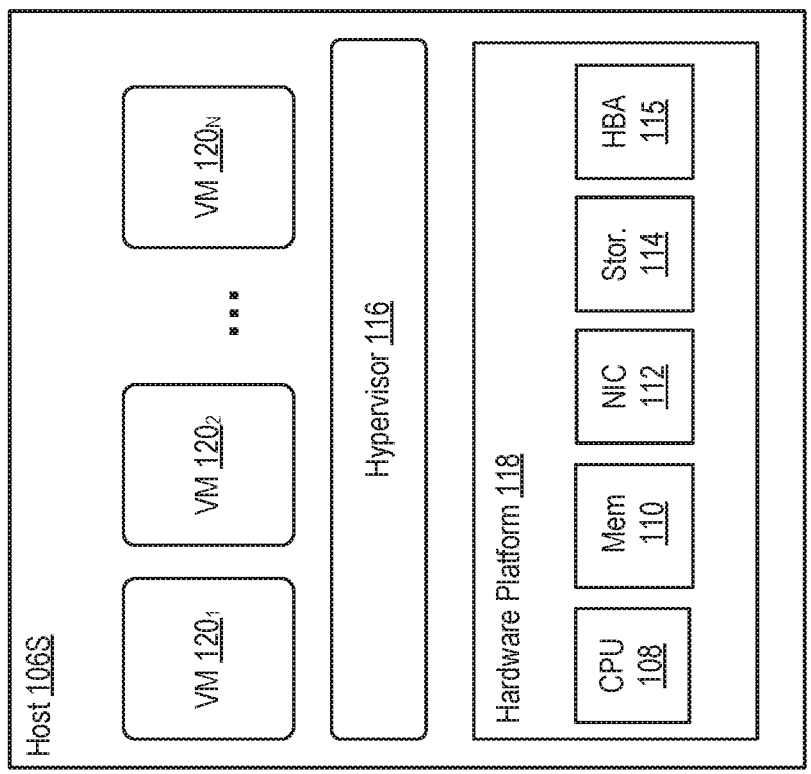
FIG. 1B depicts a block diagram of a host computer, according to an embodiment.

As shown in FIG. 1C, mobility agent 122S includes a host simulator 124. Host simulator 124 is a software module permitting source mobility agent 122S to act as if it were the destination host of the VM transfer, and likewise host simulator 124 in destination mobility agent 122D permits destination mobility agent 122D to act as a host that is the source of the VM transfer to the ultimate destination host 106D in destination data center 102D. That is, during a VM transfer, mobility agent 122S in source data center 102S acts as a destination host to receive VM data (e.g., virtual disk and memory contents) from source host 106S and transmits such data over a pair of gateways 126S and 126D to a mobility agent 122D in destination data center 102D, and mobility agent 122D in turn acts as a source host to send the data to destination host 106D in destination data center 102D, with some of the data (e.g., virtual disk data) ultimately being stored in one or more of storage units 104D. A detailed description of VM transfer via mobility agents is provided in U.S. patent application Ser. No. 15/690,241, filed Aug. 29, 2017 and entitled "Live Migration of Virtual Computing Instances Between Data Centers," which is incorporated herein by reference in its entirety.

Mobility agents 122S, 122D may also serve as data flow control modules. When data, such as a VM's disk and memory contents, is transferred from a source host 106S to a source mobility agent 122S, ultimately bound for destination data center 102D, source mobility agent 122S can slow down the rate of data transfer by "throttling" the rate at which it receives or retrieves data from source host 106S. For a detailed description of throttling, see U.S. patent application Ser. No. 15/701,387, filed Sep. 11, 2017 and entitled "Dynamic Flow Control for Transferring Data Efficiently and Effectively Over Non-Linear Buffered Network Paths," which is incorporated herein by reference in its entirety.

Network traffic on a link between mobility agent 122S and gateway 126S may flow through one or more middleboxes (not shown). A middlebox, also sometimes referred to as a "network appliance" or "network function," is a physical or virtual intermediary networking device performing functions other than the normal, standard functions of an IP router on the datagram path between a source device and a destination device. A router is a networking device that forwards data packets between nodes in a computer network and/or between computer networks. A middlebox may transform, inspect, filter, or otherwise manipulate traffic for purposes other than packet forwarding. Examples of middleboxes include firewalls and similar security devices, load balancers, network optimizers (such as wide area network optimizers), protocol accelerators, intrusion detection systems, intrusion prevention systems, and proxy/caches. One common middlebox is a WAN optimizer, such as that described in U.S. patent application Ser. No. 14/838,537, filed Aug. 28, 2015 and entitled "Data Center WAN Aggregation to Optimize Hybrid Cloud Connectivity," and in U.S. patent application Ser. No. 14/838,572, filed Aug. 28, 2015 and entitled "Pre-Fetch Cache Population for WAN Optimization," which are incorporated herein by reference in their entireties.

During transfer of a VM (e.g., VM 120) from source data center 102S to destination data center 102D, source mobility agent 122S collects information about the transfer, including data insertion rate (IR) information and throttling information. In some embodiments, source mobility agent 122S also collects information on "window slam" events that occur in its buffer, as explained below. Data insertion rate is the rate of data flow between the source host 106S and source mobility agent 122S, i.e., the rate that the VM is being transferred to source mobility agent 122S. Information about VM transfers may be collected for VMs that are transferred during the ordinary course of operations and/or for dummy VMs that are transferred specifically to obtain transfer information. As used herein, a "dummy VM" refers to a virtual machine that is typically small in size (e.g., approximately 1 GB) but can also be larger (e.g., approximately 8 GB or 40 GB), and is used to test VM transfer across a path. In one embodiment, dummy VMs may be periodically transferred through various paths of cross-site computing system 100 by source virtualization manager 132S to continuously gather updated information on those paths. For example, dummy VMs may be scheduled on different paths at different times of the day randomly to gather data from all the paths.

Source mobility agent 122S collects VM transfer information, such as IR rate information and throttling event information, every second, or at any other suitable time interval, during a VM transfer. Throttling information may include the number of times source mobility agent 122S had to throttle the source, such as for example because a destination component was lagging behind a source component during the transfer. Throttling information may also include the duration of each throttling event (e.g., in seconds). Throttling events occur when source mobility agent 122S temporarily pauses data transfer from source host 106S to source mobility agent 122S. For example, throttling may occur when components of destination data center 102D (e.g., destination mobility agent 122d) involved in the VM transfer are slower than those of source data center 102S. At the end of a VM transfer, whether successfully completed or not, source mobility agent 122S sends statistics collected, during the VM transfer, on data insertion rate and throttling events to source control module 134S.

When source mobility agent 122S receives data from source host 106S, source mobility agent 122S places this data into a buffer and then sends data from the buffer to source gateway 126S when source gateway 126 is able to receive more data. To properly perform throttle events, source mobility agent 122S should not let its buffer become full. However, sometimes the rate at which source mobility agent 122S receives data is much higher than the rate at which source mobility agent 122S is able to send data. Source mobility agent 122S, acting as a flow control module, is usually able to throttle incoming data flow to prevent the buffer of source mobility agent 122S from becoming full. In certain circumstances, incoming data may flow at a rate that is too high for source mobility agent to react on time, resulting in its buffer becoming full. A buffer of source mobility agent 122S becoming full is called a "window slam" event. Throughout a VM transfer operation, source mobility agent 122S tracks the number of window slam events that occur, and after completion of the VM transfer operation, sends this statistic to source control module 134S, as discussed is greater detail below with reference to FIG. 4.

In destination data center 102D, destination mobility agent 122D also collects statistics of the VM transfer, including data deliver rate (DR) statistics. Delivery rate is the rate of data transfer from destination mobility agent 122D to destination host 106D. At the end of the VM transfer, whether successfully completed or not, destination mobility agent 122D sends its collected DR statistics to destination control module 134D, which in turn sends the DR statistics to the source control module to be combined with DI and throttle event data for the same path. Illustratively, such collected data may be stored in raw data database 138.

As described, source control module 134S receives transfer statistics (e.g., throttle events, IR, DR, and window slam information) from source mobility agents 122S through data network 130S, and from destination mobility agents 122D through one of the connections of site interconnect 144. Source control module 134S then organizes the statistics in raw data database 138 in association with the transfer data path for which they were collected.

A path may be defined by a sequence of components in cross-site computing system 100. For example, one possible VM transfer path shown in FIG. 1A is "$104S_1$, $106S_1$, $122S_1$, $126S_1$, 140, $126D_1$, $122D_2$, $106D_1$, $104D_1$." In one embodiment, site interconnect 144 may be specifically defined in a path, such as by specifying either direct link 140 or WAN 142. In another embodiment, only site interconnect 144 may be specified, and the specific connection of site interconnect 144 that is used may be decided, e.g., by source gateway 126S, at the time of the VM transfer. A set of paths may be defined by a source storage-host pair and a destination storage-host pair. For example, the source storage-host pair and destination storage-host pair $104S_1$-$106S_1$: $104D_1$-$106D_1$ defines a set of VM transfer paths including the "$104S_1$, $106S_1$, $122S_1$, $126S_1$, 140, $126D_1$, $122D_2$, $106D_1$, $104D_1$" path and other paths that begin with source storage and host $104S_1$-$106S_1$ and end with destination storage and host $104D_1$-$106D_1$. Although discussed herein primary with respect to source storage-host and destination storage-host pairs, it should be understood that paths may also be defined in terms, e.g., of two hosts or two storages, depending on the variance of the intermediate network devices that connect the two (hosts or storage).

After source control module 134S collects all raw path statistics for a completed VM transfer (whether the transfer was successful or failed), including IR, throttle events, DR, and window slam information, source control module 134S makes inferences from the raw statistics about the particular transfer operation. Source control module 134S stores these inferences in inference database 136. Although shown as being in source data center 102S, databases 136 and 138 may also be located elsewhere, such as in destination data center 102D, or synchronized copies of databases 136 and 138 may be maintained in both data centers 102S and 102D, and databases 126 and 138 may also be combined into a single database. In another embodiment, collected information that is maintained in databases 136 and 138 may be retrieved by control module 134 when determining paths for reverse VM transfers from data center 102D to data center 102S. In a particular embodiment, databases 136 and 138 may be Online Transaction Processing (OLTP) or online analytical processing (OLAP) type databases implemented using, e.g., MongoDB®.

Figure 2:
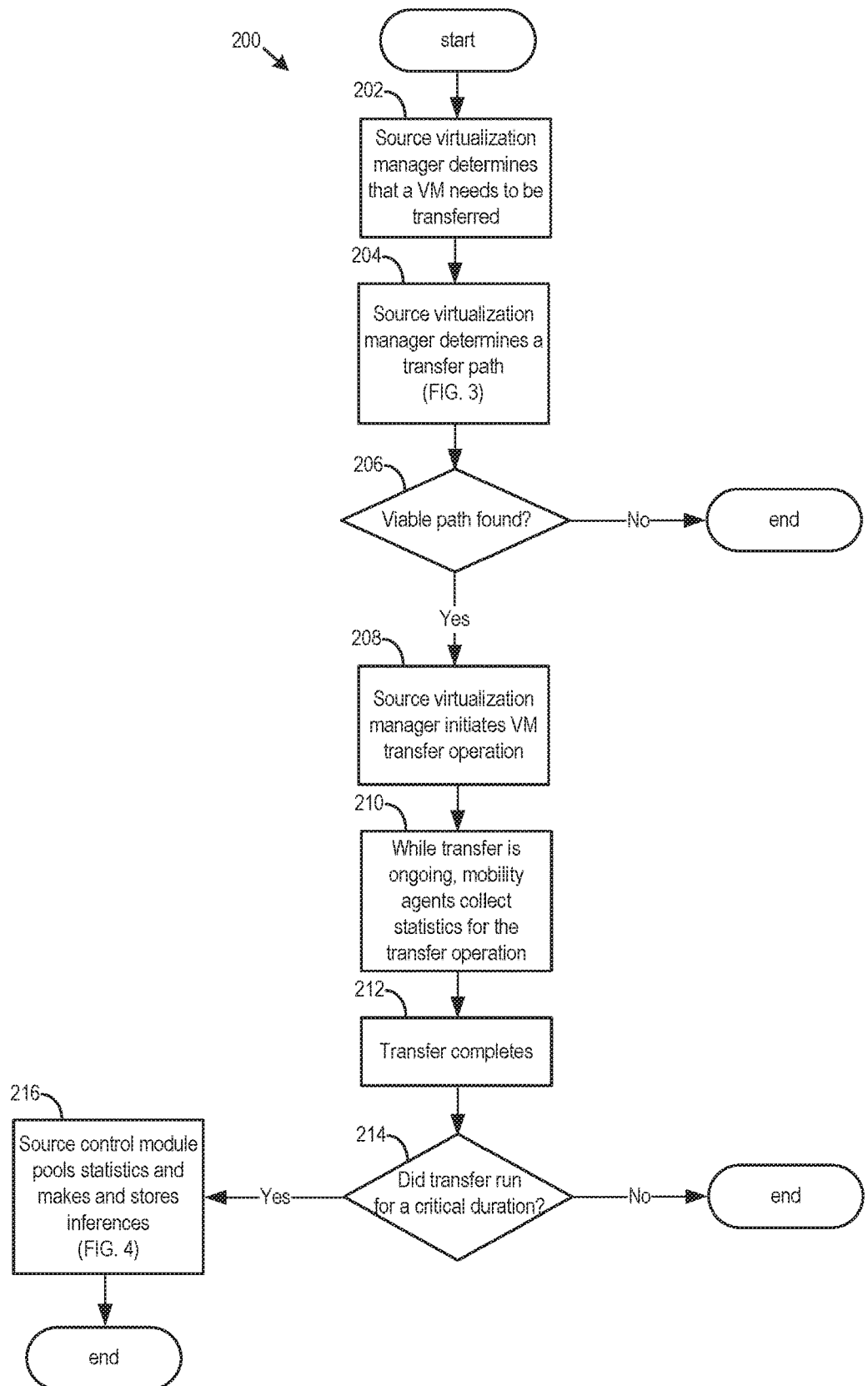
FIG. 2 depicts a top-level flow diagram of a method of transferring a virtual computing instance from a source host to a destination host, according to an embodiment.

FIG. 2 depicts a top-level flow diagram of a method 200 of transferring a VM from a source host to a destination host. As shown, at step 202, source virtualization manager 132S determines that a VM needs to be transferred. For example, the determination may be based on an administrator's request to transfer a specific VM 120 to destination data center 102D or to a specific host 106D in destination data center 102D, or source virtualization manager 132S may automatically determine the need to transfer a VM 120 based on, e.g., resource usage exceeding a predefined threshold on host 106S. Examples of techniques for automatically determining whether VMs should be migrated are disclosed in U.S. patent application Ser. No. 14/298,904, filed Jun. 7, 2014 and entitled "Decentralized Demand-Based Virtual Machine Migration Management," which is incorporated herein by reference in its entirety.

In the description of the subsequent steps of method 200, it is assumed that the VM that needs to be transferred is hosted by source host $106S_1$ and virtual disk(s) of the VM stored in source storage unit $104S_1$.

At step 204, source virtualization manager 132S, together with source control module 134S, determines a path along components of cross-site computing system 100 to transfer VM 120.

Figure 3:
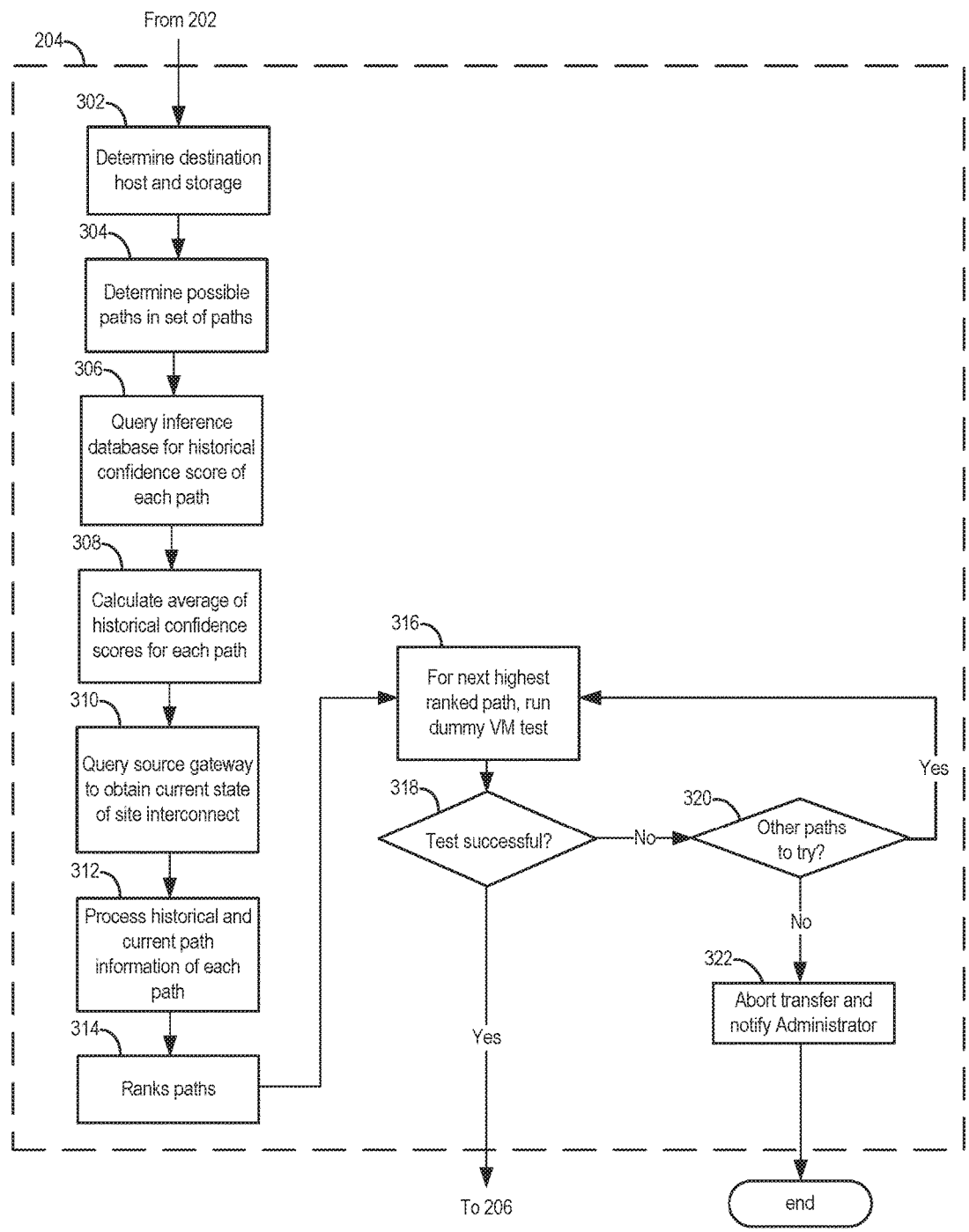
FIG. 3 is a flow diagram depicting in greater detail one of the steps of the method of FIG. 2, according to an embodiment.

FIG. 3 illustrates in greater detail step 204, according to an embodiment. As shown, at step 302, source virtualization manager 132S determines a destination host 106D and destination storage unit 104D pair to which to transfer the VM. For example, the destination host 106D and destination storage unit 104D may be specified within the administrator request received at step 202 of FIG. 2, and in such a case, source virtualization manager 132S may parse the request to obtain the needed destination information. If the information is not specified in a request or if the transfer was initiated by source virtualization manager 132S itself, then source virtualization manager 132S may determine a destination host 106D and accompanying destination storage unit 104D based on, e.g., resource usage statuses of the various destination hosts 106D and destination storage units 104D. In yet another embodiment, source virtualization manager 132S may determine which destination host 106D and/or storage 104D to transfer a VM, based on predicted likelihood of success of the transfer operation, as discussed in greater detail below. Destination host 106D resource usage statuses may include CPU 108 load, available memory 110, available local storage 114, accessible destination storage units 104D, and the like, similar to source hosts 106S. Destination storage unit 104D resource usage statuses may include available storage and current I/O load. Assuming that source virtualization manager 132S chooses destination host 106D1 as the destination host and destination storage 104D1 as the destination storage, a set of paths $104S_1$-$106S_1$: $104D_1$-$106D_1$ is defined by the source storage-host pair, discussed above, and the destination storage-host pair.

At step 304, source virtualization manager 132S determines all paths in the set of paths defined by the source host, source storage, destination host, and destination stored determined at steps 202 and 302. Continuing the above example, source virtualization manager 132S may determine all paths in the set of paths defined by $104S_1$-$106S_1$: $104D_1$-$106D_1$. With reference to FIG. 1A, the following two paths are possible in this set of paths, with differences between the two paths shown in bold:

Path 1: $104S_1$, $106S_1$, $122S_1$, $126S_1$, 140, $126D_1$, $122D_2$, $106D_1$, $104D_1$.

Path 2: $104S_1$, $106S_1$, $122S_1$, $126S_1$, 142, $126D_2$, $122D_1$, $106D_1$, $104D_1$.

At step 306, source virtualization manager 132S queries inference database 136 for historical confidence scores of each path determined at step 304. In one embodiment, a historical confidence score indicates a relative confidence of success if a VM transfer were to be attempted on an associated path under the same circumstances as previous VM transfers on that path. In one embodiment, zone tags may be assigned to histograms of information collected during a VM transfer, as discussed in detail with reference to FIG. 7, below. The generation of historical confidence scores is discussed in greater detail below with reference to step 608 of FIG. 6. For the purposes of this example, it is assumed that in the past, VM transfers (whether ordinary or dummy VMs and whether successful or not) have occurred across path 1 three times, and it is further assumed that VM transfers (whether ordinary or dummy VMs and whether successful or not) have occurred across path 2 three times. For each such VM transfer, source control module 134S calculates a respective historical confidence score. Table 1 shows examples of the three transfers across path 1 and three transfers across path 2 as well as associated historical confidence scores:

TABLE 1

| Transfer Operation | PATH | HIST. CONFIDENCE SCORE | AVG |
|---|---|---|---|
| 1 | P1 | 86 | 200 |
| 2 | P1 | 204 | |
| 3 | P1 | 310 | |
| 4 | P2 | 60 | 120 |
| 5 | P2 | 160 | |
| 6 | P2 | 140 | |

At step 308, source virtualization manager 132S uses the historical confidence scores (e.g., those in the third column of Table 1) to calculate an average historical confidence score for each path. Averages of the historical confidence scores for paths 1 and 2 in the example above are shown in the fourth column of Table 1.

At step 310, source virtualization manager 132S queries source gateway 126S of each path to obtain data about the current state of the specific site interconnect 144 of that path. For example, for path 1, source virtualization manager 132S would query source gateway $126S_1$ to obtain information that source gateway $126S_1$ has (e.g., that source gateway $126S_1$ tracks or calculates) about direct link 140, and would query source gateway $126S_1$ to obtain information that source gateway $126S_1$ has about WAN 142. In particular, the following five pieces of information may be obtained about the current states of path 1 and path 2: (1) bandwidth limit, (2) load factor, (3) available bandwidth, (4) loss percent, and (5) latency.

Bandwidth limit is the highest rate at which data is allowed to be transferred between source gateway 126S and destination gateway 126D on a given interconnect, such as on direct link 140 or WAN 142. It is also possible to specify bandwidth limits per path. Bandwidth limit may be set by an administrator. For example, the administrator may set a policy with a minimum and maximum bandwidth range. Bandwidth limit may be measured in, e.g., megabits per second. Bandwidth limit may be stored within source gateway 126S.

Load factor is a number that is calculated by source gateway 126S and provides a measure of congestion over a connection (e.g., WAN 142, direct link 140) of site interconnect 144. Load factor does not necessarily have units of measure, and load factors may be compared relative to each other to compare congestion across connections of site interconnect 144. Load factor may be tracked, calculated, and stored within source gateway 126S.

Available bandwidth is the available bandwidth across a specific connection of site interconnect 144. Available bandwidth may be measured in, e.g., megabits per second. Available bandwidth may be tracked by source gateway 126S.

Loss percent is the percent of packets lost in transit over a particular connection (e.g., WAN 142) of site interconnect 144 per unit of time, such as per second. For example, a loss percentage of 0.2% may mean that 0.2% of packets were lost in the previous one second of transmission over a given connection, such as connection 140 or 142. Loss percent may be tracked within source gateway 126S.

Latency is the time it takes for a packet to move from a source to a destination, and may be measured, e.g., in milliseconds. Latency is typically the path delay specific to a path rather than to any host. Latency may be, e.g., an average latency over last N seconds, where N may be configurable by an administrator. Latency may be measured in association with a given path or in association with a given interconnect (e.g., direct link 140 or WAN 142). Latency may be tracked, calculated, and maintained by source gateway 126S.

By querying the specific source gateway 126 of a given path, source virtualization manager 132S may obtain data such as the exemplary data shown in Table 2, below.

TABLE 2

| Path | Historical Conf. Score | App B/W Limit (Mbps) | Avail B/W (Mbps) | Loss (%) | Latency (ms) | Load Factor |
|---|---|---|---|---|---|---|
| P1 | 200 | 300 | 300 | 0.1 | 20 | 5 |
| P2 | 120 | 100 | 100 | 0.5 | 20 | 8 |

Although described with respect to the querying of source gateway 126 for current network path information above, it should be understood that source virtualization manager 132S may also query other components (e.g., hosts, storages, etc.) in the path(s) to determine their health statuses (i.e., current operating status) and further query a traffic shaping controller for traffic shaping constraints that may affect the VM transfer along the path. Such information may be used along with the current network path information and historical confidence scores to predict likelihood of success of a VM transfer over the various paths, as discussed in greater detail below.

At step 312, source virtualization manager 132S processes the data in Table 2, for each path. During such processing, the information in the columns of Table 2 may be weighted as appropriate, such as based on empirically-determined weights. A final path score may then be obtained to determine which paths are better suited for a transfer of a VM at this point in time.

In one embodiment, virtualization manager 132S may apply formula 1, below, as a way of applying weights to the information in Table 2. Each number in Table 2 may be weighted by applying formula 1, which transforms the number's value into a processed value:

$$ProcessedValue = IntialValue - \frac{(Rank-1) * IntialValue}{NumberOfDistinctValues} \quad \text{Formula 1}$$

Examples of calculations made using formula 1 are discussed below. In Formula 1, "Rank" is the rank of a number within its column. For example, the number "200" in the second column of Table 2 would have rank 1, as out of the numbers 200 and 120 in the second column, 200 is larger. In column 6 of Table 1, Latency has two numbers of equal value, and both may have a rank of 1.

In Formula 1, InitialValue is an initial value, such as a fixed value assigned to the column of the number being processed. That is, InitialValue may be the same for all numbers in a given column of Table 2. Examples of InitialValue for each column may be as follows:

Historical Confidence Score: 40
App Bandwidth Limit: 10
Avail Bandwidth: 10
Loss Percent: 20
Latency: 10
Load Factor: 10

In Formula 1, NumberOfDistinctValues may be equal to the number of distinct values in the column of the number being processed. For example, NumberOfDistinctValues for the second column (Historical Confidence Score) of Table 2 is 2, and NumberOfDistinctValues for the sixth column (Latency) is 1, as all values in the Latency column are the same.

The following is an example of transforming or processing the number 200 of the second column (Historical Confidence Score) to a processed value. When transforming the number 200, the InitialValue variable is equal to 40, the fixed InitialValue for all numbers in the Historical Confidence Score column. The Rank variable is equal to 1, as 200 is the largest number in its column. The NumberOfDistinctValues variable is equal to 2, as there are two distinct values in the Historical Confidence Score column: 200 and 120. The processed value is then calculated as $$ProcessedValue = 40 - \frac{(1-1)*40}{2},$$

which gives a result of 40, transforming the number 200 in the second column of Table 2 into the number 40.

Applying Formula 1 to each value of Table 2 produces the processed values shown in Table 3.

TABLE 3

| Path | Historical Conf. Score | App B/W Limit (Mbps) | Avail B/W (Mbps) | Loss (%) | Latency (ms) | Load Factor |
|---|---|---|---|---|---|---|
| P1 | 40 | 10 | 10 | 20 | 10 | 5 |
| P2 | 20 | 5 | 5 | 10 | 10 | 10 |

At step 314, source virtualization manager 132S ranks each path. In one embodiment, virtualization manager 132S ranks paths based on the sums of all processed values for the paths, such as the sums of all values in the rows of Table 3. A sum of all values of a row of Table 3 may be termed the "final path score." Continuing the example from above, the total of all values of row P1 (path 1) is 95, and the total of all values of row P2 (path 2) is 60. Path 1 ranks higher than path 2, as 95 is larger than 60.

At step 316, source virtualization manager 132S transfers a dummy VM across the highest ranked path from step 314, which in our example is path 1. As described, a dummy VM is typically small in size and not used for any purpose other than for testing a transfer path. Transferring the dummy VM across a path can be used to test viability of the path. If the highest ranking path from step 314 has an undetected issue up to this point, transferring a dummy VM across the path may illuminate the issue.

At step 318, source virtualization manager 132S determines whether the transfer of the dummy VM in step 314 was successful. Success and failure may be defined in any suitable manner. Failure may occur if, for example, the dummy VM was unable to reach its destination host or if the transfer was unable to complete within a predefined length of time. Success may occur if, for example, the dummy VM was fully transferred to the destination host within the predefined length of time. If the dummy VM test is unsuccessful, the method continues to step 320. If the dummy VM test is successful, the method continues to step 206 shown in FIG. 2.

At step 320, source virtualization manager 132S determines whether there are other paths available to try. If no more paths are available to try, then method source virtualization manager 132S aborts the transfer and notifies the administrator. If, on the other hand, more paths are available to try, then method 200 returns to step 316, where a dummy VM test is performed on the next best path, which in our example would be path 2.

Returning to FIG. 2, at step 206, if a viable path was found, then method 200 continues to step 208, where source virtualization manager 132S initiates a transfer of VM 120 that was determined to need a transfer at step 202. Assuming that path 1 successfully passed the dummy VM test at step 318 and was chosen as the transfer path, then source virtualization manager 132S executes a transfer workflow from the source host, source storage pair ($104S_1$-$106S_1$) to source mobility agent $122S_1$, and, on the destination side, destination virtualization manager 132D executes a migration workflow between destination mobility agent 122D and destination host 104D. In an embodiment, the chosen transfer interconnect, in this example direct link 140, may be provided to the appropriate gateway, in this example source gateway $126S_1$. In another embodiment, source gateway $126S_1$ may determine the proper interconnect itself after being provided the target destination gateway 126D component of the path. Then, data is transferred, in order, from source host, source storage pair ($104S_1$-$106S_1$) to source mobility agent $122S_1$ to source gateway $126S_1$, through direct link 140, to destination gateway 126D₁, to destination mobility agent 122D₂, and finally to the destination host-storage pair (106D₁-104D₁).

In another embodiment, source virtualization manager 132S may also determine to which destination host 106D and/or storage 104D to transfer a VM based on predicted likelihood of success of the transfer operation and also based on steps 204-206. That is, the predicted likelihood of VM transfer success may be used by source virtualization manager 132S to determine the path to use, including sometimes which destination host and/or storage to transfer the VM to, and the source gateway (e.g., gateway 126S₁) may also use the predicted likelihood of success to choose a network path to use. In another embodiment, source gateway 126S itself may utilize raw and/or inferred information from histograms in a similar manner to that discussed herein to choose a network path (e.g., direct link 140 or WAN 142) over site interconnect 144. In yet other embodiment, the VM transfer process may be based in part on user input. For example, a list of one or more transfer paths predicted to be most likely to succeed may be displayed to a user who then selects one of those paths for use in actually transferring the VM.

At step 210, while transfer of VM 120 is in progress, source mobility agent 122S₁ and destination mobility agent 122D₁ collect statistics regarding the VM transfer. As described above, source mobility agent 122S₁ collects statistics regarding data insertion rate (IR), throttle events, and window slam events, and destination mobility agent 122D₁ collects statistics regarding data delivery rate (DR). IR is the rate of data flow between source host 106S₁ and source mobility agent 122S₁. Throttling events occur when source mobility agent 122S temporarily pauses data transfer from source host 106S₁ to source mobility agent 122S₁. DR is the rate of data transfer from destination mobility agent 122D₁ to destination host 106D₁. In an embodiment, IR, throttling event, and DR data are collected once per second during the VM transfer.

At step 212, transfer of VM 120 completes. The transfer may complete as a result of a successful transfer or as a result of a failed transfer.

At step 214, each mobility agent 122S₁, 122D₁ determines if the duration of the VM transfer is greater than or equal to a minimum predefined period of time. In one embodiment, a VM transfer is required to have proceeded for at least a certain minimum length of time for collected statistics about the VM transfer to be used. The duration of a VM transfer operation may fall short of the predefined duration if the VM transferred is very small in size, or if the transfer operation aborted before successful completion. If duration of the transfer operation was equal to or more than the predefined duration, then method 200 proceeds to step 216. If duration of the transfer operation was less than the predefined duration, then method 200 ends. Upon ending as a result of falling short of the predefined duration, virtualization manager 132S may, e.g., try the transfer operation anew or notify an administrator.

At step 216, VM transfer information collected by mobility agents 122S₁, 122D₁ is pooled by source control module 134S, which also makes and stores inferences using the information, as described in more detail with reference to FIG. 4.

Figure 4:
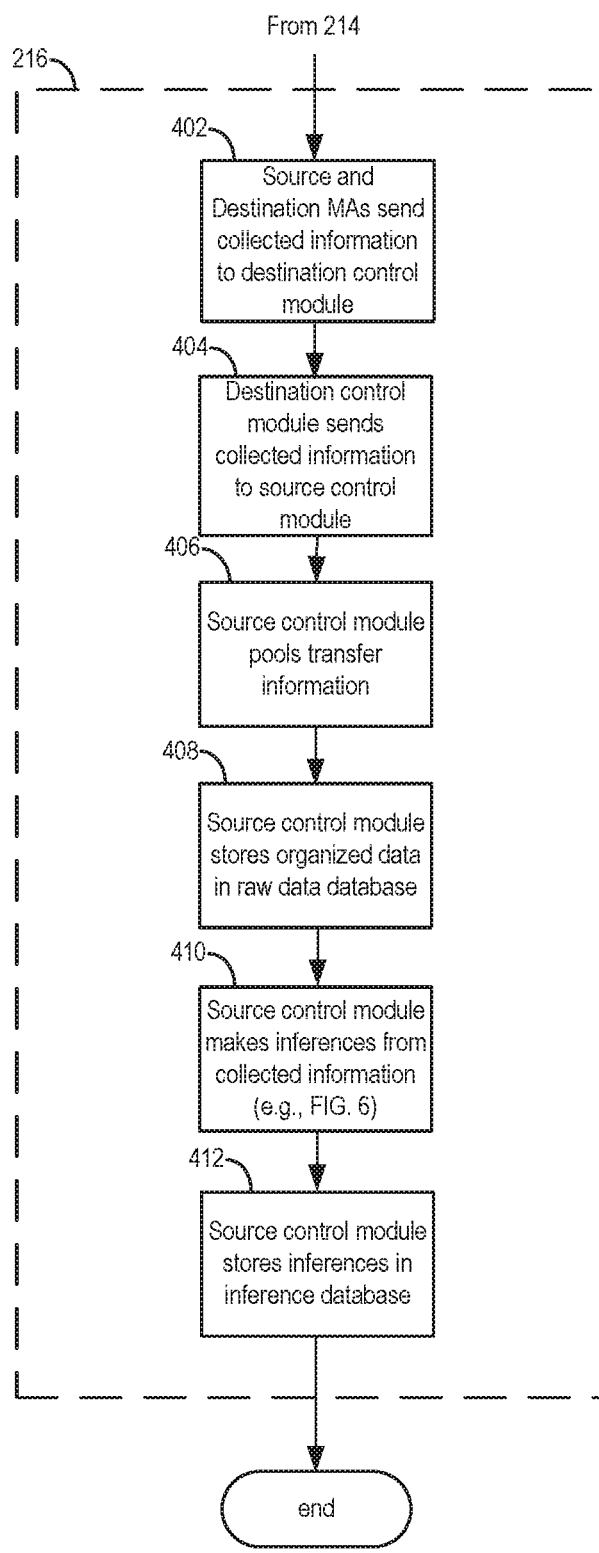
FIG. 4 is a flow diagram depicting in greater detail another one of the steps of the method of FIG. 2, according to an embodiment.

FIG. 4 illustrates in greater detail step 216, according to an embodiment. As shown, at step 402, source mobility agent 122S₁ sends VM transfer information that it collected at step 210 to source control module 134S, and destination mobility agent 122D₁ sends VM transfer information that it collected at step 210 to destination control module 134D. As described, the information collected by source mobility agent 122S₁ may include IR and throttle event data, as well as window slam data.

At step 404, destination control module 134 sends the VM transfer information received from destination mobility agent to source control module 134S. Sending of information by source mobility agent 122S₁, destination mobility agent 122D₁, destination control module 134 in steps 402 and 404 may occur in parallel in one embodiment.

At step 406, source control module 134S pools the VM transfer information it receives, pertaining to the VM transfer of steps 208-212 in FIG. 2. Source control module 134S also generates histograms using such information. A histogram is a representation of a distribution of numerical data, and a histogram may include intervals each defined by a range of values, with a count of samples that fall within each interval being associated with that interval.

Figure 5B:
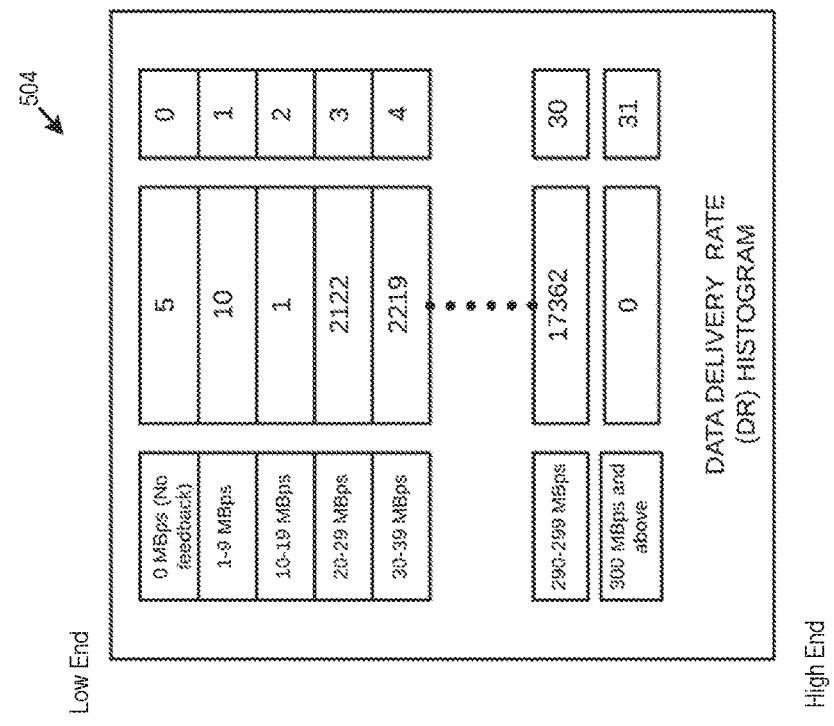
FIG. 5B depicts a block diagram of an exemplary partial histogram including delivery rate data.
Figure 5A:
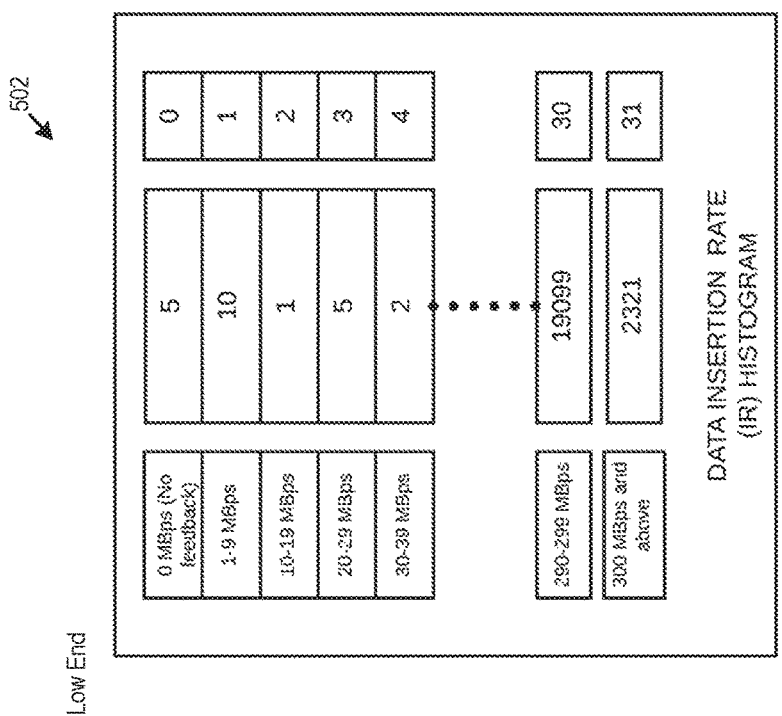
FIG. 5A depicts a block diagram of an exemplary partial histogram including insertion rate data.
Figure 5D:
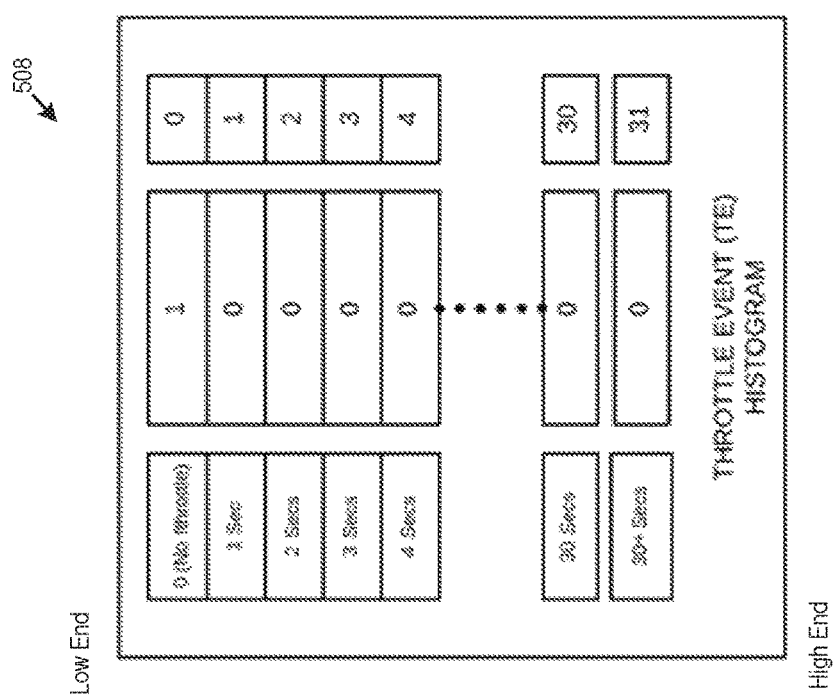
FIG. 5D depicts a block diagram of another exemplary partial histogram including throttle event data.
Figure 5C:
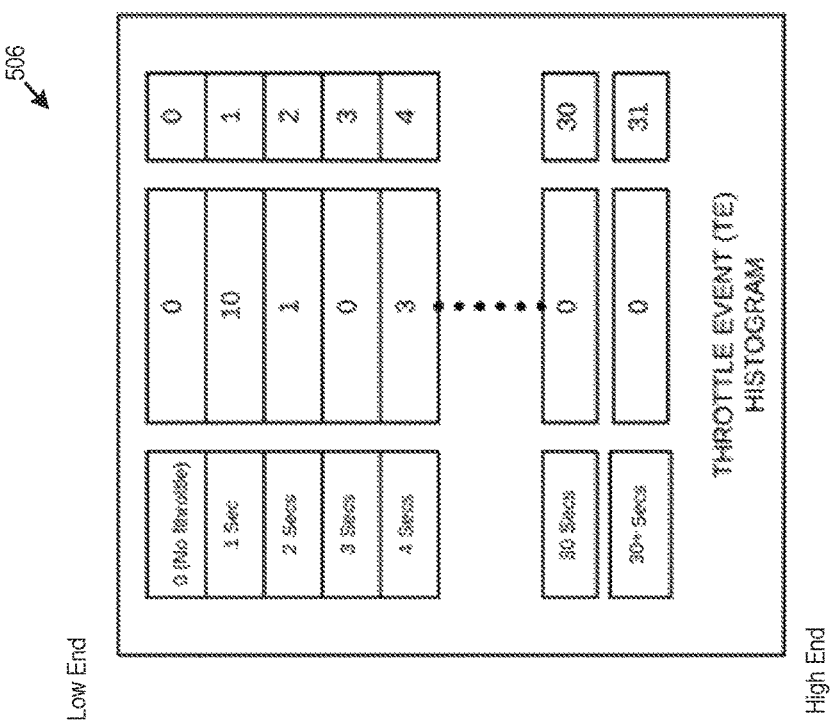
FIG. 5C depicts a block diagram of an exemplary partial histogram including throttle event data.

Examples of partial sample histograms for VM transfer information are shown in FIGS. 5A-D. It will be assumed that the partial sample histograms of FIGS. 5A-C were generated for the VM transfer of steps 208-212 in FIG. 2, while the histogram in FIG. 5D is for illustration purposes only. Each histogram of FIGS. 5A-D has three columns and a number of rows. Each entry in the first column of the three columns represents a range of values and the corresponding second column entry contains the number of collected samples that fall within that range. Each entry of the third column represents the row number in the histogram. As known in the art, a histogram may be represented as a bar graph. The first column of the histograms in FIGS. 5A-D corresponds to what would usually be the x-axis, and the second column corresponds to the y-axis of such bar graph. For each histogram 502, 504, 506, and 508, samples were taken by either mobility agent 122S₁ or 122D₁ at a frequency of once per second. Further, each of FIGS. 5A-D is labeled with a "low end" and a "high end." The low end of histograms 502, 504, 506, and 508 is the end with the lower values of the first column, and the high end of histograms 502, 504, 506, and 508 is the end with the higher values of the first column. Illustratively, the first column of each histogram 502, 504, 506, and 508 is ordered in ascending order, from the low end to the high end.

As shown, FIG. 5A depicts an exemplary histogram 502 that organizes data insertion rate (IR) samples of a particular VM transfer operation. Row 0 of histogram 502 indicates that during five of the seconds of the VM transfer operation, IR was zero. These five seconds were not necessarily consecutive. Rather, row 0 indicates five of the IR samples taken by source mobility agent 122S₁ during the VM transfer operation were zero. Row 30 of histogram 502 indicates that the vast majority of the IR samples, specifically 19099 samples, taken by source mobility agent 122S₁ during the VM transfer operation had an IR between 290 and 299 megabits per second. DR histograms, such as histogram 504, communicate information similarly to IR histograms, such as histogram 502, except the data is for data delivery rate rather than for data insertion rate.

Throttle event histograms, such as histograms 506 and 508, communicate duration of throttle events and the number of throttle events with a specific duration. For example, row 1 of histogram 506 indicates that during a VM transfer operation, ten throttle events lasting one second each occurred, and row 4 of histogram 506 indicates that during the VM transfer operation of steps 208-212, three throttle events each lasting four seconds occurred. Throttle event histogram 508 indicates that no throttle event occurred during an associated VM transfer operation. Row 0 of histogram 508 can be interpreted as indicating that exactly one throttle event of length 0 occurred during its VM transfer operation, which is the same as no throttle events occurring.

At step 410, source control module 134 stores histogram information from step 408 in raw data database 138. At step 412, source control module 134S makes inferences about the information from step 408, which is described in greater more with reference to FIG. 6.

Figure 6:
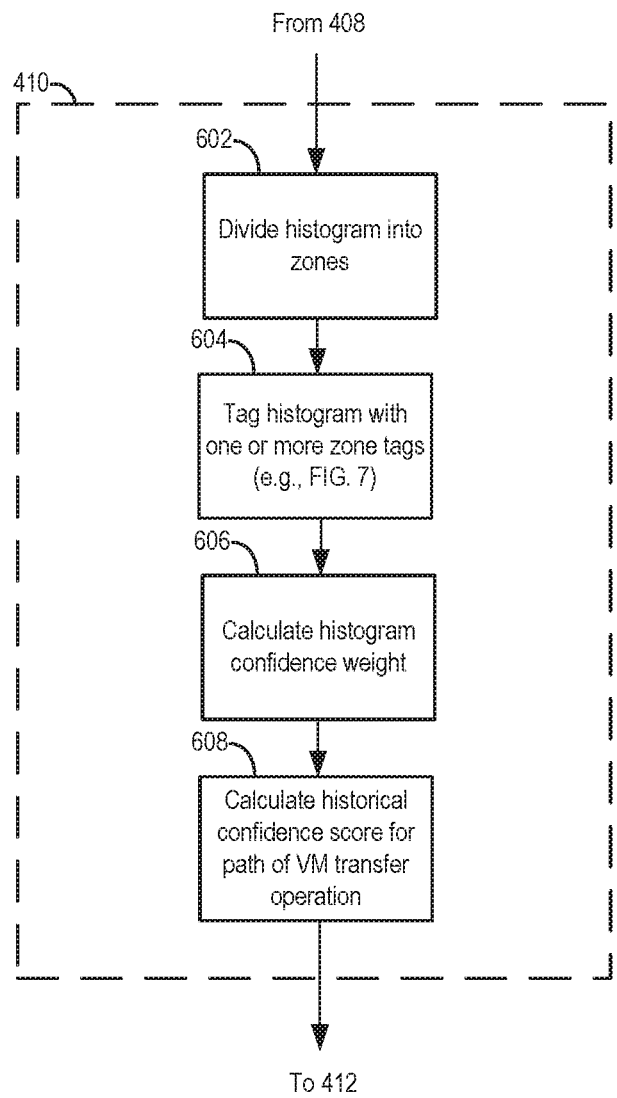
FIG. 6 is a flow diagram depicting in greater detail one of the steps shown in FIG. 4, according to an embodiment.

FIG. 6 is a flow diagram depicting in greater detail step 412 shown in FIG. 4. In general, any suitable inferences may be made by source control module 134S from histogram data, such as inferences made according to FIG. 6. As inferences are made, or after they are made by source control module 134S, the inferences may be stored in inference database 136 and later utilized in determining a path to use in transferring another VM.

At step 602, source control module 134S divides the histograms into "zones." For example, DR and DI histograms, such us histograms 502 and 504, may each be divided into four zones: Zone 0, Zone 1, Zone 2, and Zone 3. In this example, Zone 0 is a special zone including a single row: row 0. As described above, samples in row 0 of a DR or DI histogram may indicate special conditions. Zones 1, 2, and 3 may evenly divide the rest of an IR or DR histogram into consecutive segments of approximately equal size. For example, for histograms 502 and 504, Zone 1 may include rows 1-10, Zone 2 may include rows 11-20, and Zone 3 may include rows 21-31.

Source control module 134S also divides throttle histograms, such as histograms 506 and 508, into zones. For example, throttle histograms 506 and 508 may each be divided into five zones: Zone 0, Zone 1, Zone 2, Zone 3, and Zone 4. Zone 0 is a special zone including a single row: row 0. Samples in row 0 of a DR or DI histogram may indicate special conditions. Zones 1, 2, 3, and 4 may divide the rest of a throttle histogram into consecutive segments. For example, Zone 1 may encompass approximately 15% of the lowest values in column 1 of a throttle histogram, Zone 2 may encompass approximately the next lowest 15% of values in column 1, Zone 3 may encompass approximately the next lowest 30% of values in column 1, and Zone 4 may encompass approximately the highest 30% of values in column 1. For example, for histograms 506 and 508, Zone 1 may include rows 1-5, Zone 2 may include rows 6-10, Zone 3 may include rows 11-20, and Zone 4 may include rows 21-31.

At step 604, source control module 134S tags each histogram with one or more zone tags. A "tag" may be considered a type of inference. Source control module 134S may tag a histogram by associating inferred tag(s) with the histogram. Zone tags may be applied differently depending on the type of histogram. Step 604 is described in more detail with reference to FIG. 7.

Figure 7:
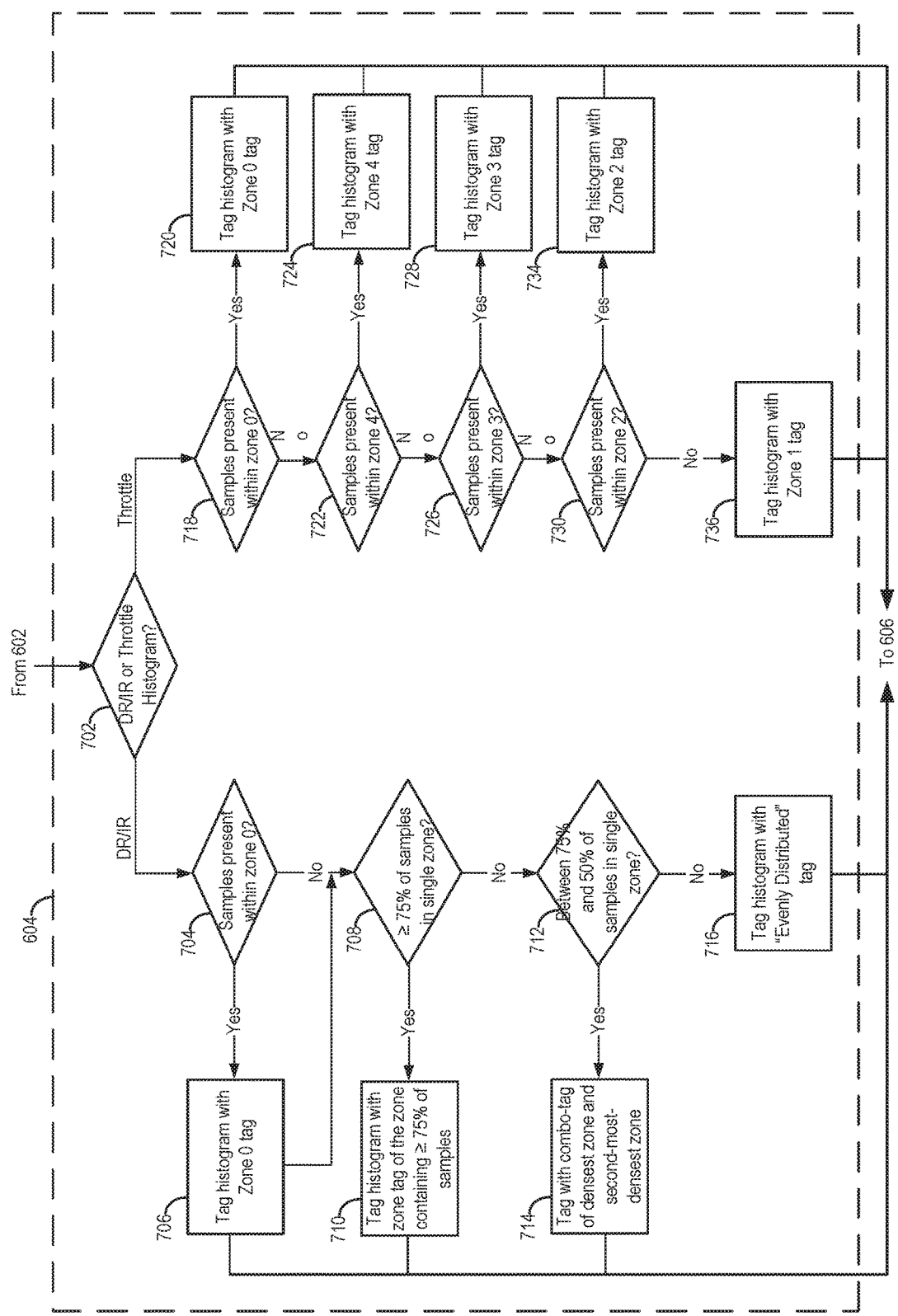
FIG. 7 is a flow diagram depicting in greater detail an approach for tagging a histogram with zone tags, according to an embodiment.

FIG. 7 is a flow diagram depicting steps performed by source control module 134S in step 604 to tag a histogram with one or more zone tags. As shown, at step 702, the method splits between a flow for a DR or IR histogram, or alternatively, a flow for a throttle histogram. If the histogram being tagged is a DR or IR histogram, then at step 704, source control module 134 first analyzes Zone 0, which includes only row 0 of the histogram. If the sample count value (in the second column) of row 0 of an IR or DR histogram is more than zero, then at step 706, the IR or DR histogram is tagged with a "Zone 0" tag. A histogram may be tagged with more than one Zone tag. An IR or DR histogram tagged with a "Zone 0" tag may indicate various properties about the histogram. An IR histogram tagged with a "Zone 0" tag may indicate some, all, or none of the following: (1) no data was transferred between source host 106S and source mobility agent 122S during that second, (2) a throttle event was in progress, and (3) a window slam event occurred. A DR histogram tagged with a "Zone 0" tag may indicate some, all, or none of the following: (1) no data was flowing across interconnect 144, and (2) problems with destination host 106D or destination storage 104D preventing data from flowing from destination mobility agent 122D to destination host 106D. Components of the cross-site computing system 100 may be queried to ascertain which one or more of these possibilities is the actual cause.

At step 708, if source control module 134 determines that any of zones 1-3 of the IR or DR histogram contains 75% or more of the total histogram samples, then at step 710, source control module 134S tags the histogram with that zone tag, which could be in addition to a previous Zone 0 tag. For example, if Zone 3 of the IR or DR histogram includes 75% or more of the samples, then the histogram is tagged with a "Zone 3" tag. A Zone 3 tag on an IR or DR histogram may indicate that the VM transfer operation associated with that histogram was on a high-throughput path. A Zone 2 tag on an IR or DR histogram may indicate that the VM transfer operation associated with that histogram was on a medium-throughput path. A Zone 1 tag on an IR or DR histogram suggests that the VM transfer operation associated with that histogram was on a low-throughput path.

At step 712, if source control module 134 determines that any of zones 1-3 of the IR or DR histogram contains between 50% and 75% of the samples, then at step 714, the zone with the second highest percentage of samples is also located, and the histogram is tagged with a combination tag of two zones: (1) between 50% and 75% of the samples, and (2) the zone including the second-most samples after the Zone including between 50% and 75% of the samples. For example, if Zone 1 has 60% of the samples and Zone 2 has 30% of the samples, then the histogram would be tagged with a "Zone 1-Zone 2" tag. Such a tag would indicate that the path of the VM transfer operation associated with the histogram was a low to medium throughput path.

At step 716, the only tagging option remaining for samples within the histogram is that the samples are evenly distributed throughout the histogram. If method 700 reaches step 716, source control module 134S tags the histogram with an "Evenly Distributed" tag. An IR or DR histogram with evenly distributed samples indicates that the path of its VM transfer has a varying, unstable throughput signaling problems with destination storage unit 104D or an over-congested path.

Returning to step 702, if the histogram being tagged is a throttle event histogram, then method 700 proceeds to step 718, where source control module 134 determines whether any samples are present in Zone 0 of the throttle histogram If any samples are present in Zone 0 of the throttle histogram, then at step 720, the histogram is tagged with a Zone 0 tag. As discussed previously, a throttle event histogram with a sample in Zone 0 indicates that no throttle events occurred, which means that the rest of the histogram is empty. Steps 722 through 736 accomplish the task of tagging the throttle event histogram with the highest zone that has at least one sample. In an embodiment, steps 722-736 tag the histogram with only one tag out of the tags Zone 1, Zone 2, Zone 3, and Zone 4. At step 722, source control module 134 checks whether the throttle event histogram has any samples in Zone 4, and if so, tags the histogram with a Zone 4 tag at step 724.

Otherwise, source control module 134S checks whether the histogram has any samples in Zone 3, and if so, tags the histogram with a Zone 3 tag in step 728. If Zone 3 has no samples in it, then source control module 134S checks Zone 2, and if samples are present in Zone 2, source control module 134S tags the histogram with a Zone 2 tag. If method 700 reaches step 736, then source control module 134S tags the histogram with a Zone 1 tag.

A throttle event histogram tagged with a Zone 0 tag indicates no throttling had occurred, which is the most desirable and best case, indicating a transfer path that is likely reliable and with few glitches. A throttle event histogram tagged with a Zone 1 tag indicates that the path has occasional small throttle events. The cause may be, for example, a slow destination storage unit 104D, a slow interconnect 144, and/or an imbalance in compression and decompression operations in a middlebox, such as a WAN optimizer. A throttle event histogram tagged with a Zone 2 tag may indicate slowness in either interconnect 144 or destination storage unit 104D. A Zone 3 tag may indicate serious choke points along the path. A Zone 4 tag may indicate an infrastructure problem in either interconnect 144 or in destination storage unit 104D. A histogram tagged with Zone 4 is likely associated with a path that does not result in successfully completed VM transfer operations.

Returning to step 606 of FIG. 6, source control module 134S calculates a histogram confidence weight for each histogram of the VM transfer path. In this example, there are three histograms: IR, DR, and throttle event. A histogram confidence weight gives an approximation of the quality of a path (throughput, consistency, etc.) associated with that histogram.

The histogram confidence weight of a DR histogram may be determined in a variety of ways. The following is one calculation that may be made to determine a histogram confidence weight of a DR histogram. In one embodiment, the initial value of the histogram confidence weight is zero. If the VM transfer operation that the DR histogram is associated with is fully completed (the entire VM reached its destination host 106D), then the histogram confidence weight is increased by 20. Then if 75% or more of the samples in the histogram are in a single zone, the histogram confidence weight increased by 20. If not, then if 50% to 74% of the samples in the histogram are in a single zone, the histogram confidence weight is increased by 10. If none of the zones contain 50% or more of the samples, then the histogram confidence weight is increased by 5. Then, the histogram confidence weight is multiplied by the average of all zone tags between 1 and 3. That is, if the histogram is tagged with a combination tag of Zone 1 and Zone 2, then the histogram confidence weight is multiplied by 1.5. If the histogram is tagged with only a Zone 2 tag, then the histogram confidence weight is multiplied by 2.

The histogram confidence weight of an IR histogram may be calculated the same way as for a DR histogram above in one embodiment, while additionally taking into account window slam events. In such a case, after histogram confidence weight of an IR histogram is multiplied by the average of its zone tags 1 through 3, the histogram confidence weight is further adjusted depending on the number of window slam events that occurred during the VM transfer operation associated with the DR histogram. If no window slam events occurred, then the histogram confidence weight remains the same. If one or more window slam events occurred, then the histogram confidence weight is reduced based on the number of window slam events. For example, if 1 to 5 window slam events occurred, then the histogram confidence weight may be decreased by 5, if 6 to 10 window slam events occurred, then the histogram confidence weight may be decreased by 10, and if more than 10 window slam events occurred, then the histogram confidence weight may be decreased by 20.

The histogram confidence weight of a throttle event histogram may be determined as follows. In one embodiment, the initial value of the throttle event histogram confidence weight is zero, and the histogram confidence weight is adjusted (e.g., increased or decreased) based on the duration of throttle events. For example, if no throttling occurred, the histogram confidence weight may be increased by 20; if no throttles lasted more than 5 seconds, the histogram confidence weight may be increased by 10; if all throttle durations are longer than 5 seconds but shorter than 10 seconds, the histogram confidence weight may be increased by 5; if all throttle durations are 10 seconds or longer but shorter than 15 seconds, the histogram confidence weight may be decreased by 10; if all throttle durations are 15 seconds or longer but shorter than 20 seconds, the histogram confidence weight may be decreased by 15; and if all throttle durations are greater than 20 seconds, the histogram confidence weight may be decreased by 30. Then, if 25% or less of samples are in Zone 1 of the throttle histogram, then the histogram confidence weight is increased by 10. If 26% to 50% of the samples are in Zone 1, then the histogram confidence weight is increased by 20. If more than 50% of the samples are in Zone 1, then the histogram confidence weight is increased by 30.

After source control module 134S calculates a histogram confidence weight for each histogram associated with a path of a VM transfer operation at step 606 of FIG. 6, then at step 608, source control module 134 calculates a historical confidence score for the path associated with the VM transfer operation. This is the same historical confidence score queried by source virtualization manger 132S in step 306, discussed above. In one embodiment, the historical confidence score of a path is calculated by summing together the histogram confidence weight of each histogram associated with the path. After step 608, the process returns to step 412 of FIG. 4.

At step 412, source control module 134S stores in inference database 136 the inferences that were made. As described, the inferences may include zone tags, histogram confidence weights, and the historical confidence score of the path of the VM transfer operation.

In a further embodiment, source control module 134S may determine a high throughput confidence that indicates a confidence that a VM transfer will occur with high throughput and not just have a successful outcome. In such a case, another weight may be determined just for the high zone histogram area of the remote writes, with weights similar to those discussed above (e.g., 75%=+20, 50%–74%=+10, else +5) and zone multipliers, and the high throughput confidence measure may be used (e.g., added to) along with other measures to determine a histogram confidence weight, a historical confidence score, and the final path score of a path.

In additional embodiments, machine learning may be utilized to make inferences from histograms. For example, the inference problem may be considered a Bayes' theorem problem and solved using a Frequentist Interpretation approach.

Advantageously, techniques disclosed herein maintain a set of information, in the form of histograms and/or inferences from histograms, relating to VM transfer characteristics on a number of paths. A particular path can then be selected for a VM transfer based on the stored information before initiating the transfer, thereby improving usage of resources and increasing the likelihood of the VM transfer's success.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer-implemented method of transferring a first virtual computing instance from a first data center to a second data center, comprising:

determining at least one of throughput and throttling information associated with transfers of one or more virtual computing instances over a plurality of paths from a host and a storage unit in the first data center to one or more hosts and one or more storage units in the second data center;

generating, for each of the transfers of the one or more virtual computing instances, one or more histograms using the at least one of throughput and throttling information that is determined for the transfer;

predicting, for each of the plurality of paths, a corresponding likelihood of success if the first virtual computing instance were transferred over the path based, at least in part, on one or more distributions of samples in the histograms generated for transfers of virtual computing instances over the path; and transferring the first virtual computing instance over one of the plurality of paths based, at least in part, on the predicted likelihood of success corresponding to the one of the plurality of paths.

2. The computer-implemented method of claim 1, wherein the predicting, for each of the plurality of paths, the corresponding likelihood of success includes:

dividing each of the histograms generated for transfers of the one or more virtual computing instances over the path into a plurality of zones;

tagging each of the one or more histograms with one or more zone tags based, at least in part, on distributions of samples across the plurality of zones;

determining a confidence weight for each histogram of the one or more histograms based, at least in part, on the one or more zone tags the histogram is tagged with; and determining a confidence score for the path based, at least in part, on the confidence weights of each of the one or more histograms.

3. The computer-implemented method of claim 1, wherein the predicting, for each of the plurality of paths, the corresponding likelihood of success includes:

determining a corresponding confidence score reflecting throughput and/or reliability of the path based, at least in part, on the one or more distributions of samples in the histograms generated for transfers of virtual computing instances over the path;

determining a current state of a network connection in the path; and determining the corresponding likelihood of success based on the corresponding confidence score determined for the path and the current state of the network connection in the path.

4. The computer-implemented method of claim 1, further comprising, subsequent to the transfer of the first virtual computing instance:

determining at least one of throughput and throttling information associated with the transfer of the first virtual computing instance; and storing the determined at least one of throughput and throttling information associated with the transfer of the first virtual computing instance in one or more databases.

5. The computer-implemented method of claim 4, further comprising, prior to the storing:

completing the transfer of the first virtual computing instance over the one of the plurality of paths; and determining that a duration of the transfer of the first virtual computing instance over the one of the plurality of paths is longer than a predefined duration.

6. The computer-implemented method of claim 1, wherein the transfers of the one or more virtual computing instances over the plurality of paths includes transfers of dummy virtual computing instances used to test the plurality of paths.

7. The computer-implemented method of claim 1, further comprising, prior to initiating the transfer of the first virtual computing instance over the one of the plurality of paths, transferring a dummy virtual computing instance test over the one of the plurality of paths.

8. The computer-implemented method of claim 1, wherein the determined at least one of throughput and throttling information includes at least one of data insertion rate information, data delivery rate information, throttling events information, and window slam events information.

9. The computer-implemented method of claim 1, wherein the one of the plurality of paths is one of a wide area network and a direct connect network.

10. The computer-implemented method of claim 1, further comprising, predicting, for each of the plurality of paths, a corresponding likelihood of high throughput if the first virtual computing instance were transferred over the path based, at least in part, on one or more distributions of samples in the histograms generated for transfers of virtual computing instances over the path.

11. The computer-implemented method of claim 1, wherein the virtual computing instance is a virtual machine.

12. A non-transitory computer-readable storage medium comprising instructions, which when executed by a computing system, causes the computing system to carry out operations for transferring a first virtual computing instance from a first data center to a second data center, the operations comprising:

determining at least one of throughput and throttling information associated with transfers of one or more virtual computing instances over a plurality of paths from a host and a storage unit in the first data center to one or more hosts and one or more storage units in the second data center;

generating, for each of the transfers of the one or more virtual computing instances, one or more histograms using the at least one of throughput and throttling information that is determined for the transfer;

predicting, for each of the plurality of paths, a corresponding likelihood of success if the first virtual computing instance were transferred over the path based, at least in part, on one or more distributions of samples in the histograms generated for transfers of virtual computing instances over the path; and transferring the first virtual computing instance over one of the plurality of paths based, at least in part, on the predicted likelihood of success corresponding to the one of the plurality of paths.

13. The computer-readable storage medium of claim 12, wherein the predicting, for each of the plurality of paths, the corresponding likelihood of success includes:

dividing each of the histograms generated for transfers of the one or more virtual computing instances over the path into a plurality of zones;

tagging each of the one or more histograms with one or more zone tags based, at least in part, on distributions of samples across the plurality of zones;

determining a confidence weight for each histogram of the one or more histograms based, at least in part, on the one or more zone tags the histogram is tagged with; and determining a confidence score for the path based, at least in part, on the confidence weights of each of the one or more histograms.

14. The computer-readable storage medium of claim 12, wherein the predicting, for each of the plurality of paths, the corresponding likelihood of success includes:
    determining a corresponding confidence score reflecting throughput and/or reliability of the path based, at least in part, on the one or more distributions of samples in the histograms generated for transfers of virtual computing instances over the path;
    determining a current state of a network connection in the path; and
    determining the corresponding likelihood of success based on the corresponding confidence score determined for the path and the current state of the network connection in the path.

15. The computer-implemented method of claim 12, the operations further comprising, subsequent to the transfer of the first virtual computing instance:
    determining at least one of throughput and throttling information associated with the transfer of the first virtual computing instance; and
    storing the determined at least one of throughput and throttling information associated with the transfer of the first virtual computing instance in one or more databases.

16. The computer-readable storage medium of claim 15, the operations further comprising, prior to the storing:
    completing the transfer of the first virtual computing instance over the one of the plurality of paths; and
    determining that a duration of the transfer of the first virtual computing instance over the one of the plurality of paths is longer than a predefined duration.

17. The computer-implemented method of claim 12, wherein the transfers of the one or more virtual computing instances over the plurality of paths includes transfers of dummy virtual computing instances used to test the plurality of paths.

18. The computer-implemented method of claim 12, the operations further comprising, prior to initiating the transfer of the first virtual computing instance over the one of the plurality of paths, transferring a dummy virtual computing instance test over the one of the plurality of paths.

19. The computer-implemented method of claim 12, wherein the determined at least one of throughput and throttling information includes at least one of data insertion rate information, data delivery rate information, throttling events information, and window slam events information.

20. A system, comprising:
    a memory; and
    a processor storing one or more applications, which, when executed on the processor, perform operations for transferring a first virtual computing instance from a first data center to a second data center, the operations comprising:
    determining at least one of throughput and throttling information associated with transfers of one or more virtual computing instances over a plurality of paths from a host and a storage unit in the first data center to one or more hosts and one or more storage units in the second data center,
    generating, for each of the transfers of the one or more virtual computing instances, one or more histograms using the at least one of throughput and throttling information that is determined for the transfer,
    predicting, for each of the plurality of paths, a corresponding likelihood of success if the first virtual computing instance were transferred over the path based, at least in part, on one or more distributions of samples in the histograms generated for transfers of virtual computing instances over the path, and
    transferring the first virtual computing instance over one of the plurality of paths based, at least in part, on the predicted likelihood of success corresponding to the one of the plurality of paths.

* * * * *